(12) United States Patent
Karthikeyan et al.

(10) Patent No.: US 10,792,890 B2
(45) Date of Patent: Oct. 6, 2020

(54) TEXTURED AND DIGITALLY PRINTED DECORATIVE SURFACING MATERIALS

(71) Applicant: WILSONART LLC, Austin, TX (US)

(72) Inventors: Arvind S. Karthikeyan, Temple, TX (US); Jerry Wayne Kerzee, Belton, TX (US)

(73) Assignee: Wilsonart LLC, Austin, TX (US)

( * ) Notice: Subject to any disclaimer, the term of this patent is extended or adjusted under 35 U.S.C. 154(b) by 139 days.

(21) Appl. No.: 16/109,888

(22) Filed: Aug. 23, 2018

(65) Prior Publication Data

US 2019/0061317 A1 Feb. 28, 2019

Related U.S. Application Data

(60) Provisional application No. 62/549,113, filed on Aug. 23, 2017.

(51) Int. Cl.

| | | |
|---|---|---|
| *B32B 7/12* | (2006.01) | |
| *B44C 1/10* | (2006.01) | |
| *B44C 3/02* | (2006.01) | |
| *B41M 3/06* | (2006.01) | |
| *B41M 5/00* | (2006.01) | |
| *B44C 5/04* | (2006.01) | |
| *B32B 21/02* | (2006.01) | |

(52) U.S. Cl.
CPC .............. *B32B 7/12* (2013.01); *B32B 21/02* (2013.01); *B41M 3/06* (2013.01); *B41M 5/0082* (2013.01); *B44C 1/10* (2013.01); *B44C 3/025* (2013.01); *B44C 5/04* (2013.01); *B44C 5/0446* (2013.01); *B41M 5/0011* (2013.01); *B41M 5/0041* (2013.01)

(58) Field of Classification Search
USPC .......................................................... 156/277
See application file for complete search history.

(56) References Cited

U.S. PATENT DOCUMENTS

| | | | | |
|---|---|---|---|---|
| 6,040,853 | A * | 3/2000 | Delagnes ................. | G01C 7/04 348/128 |
| 9,199,428 | B2 | 12/2015 | Riebel et al. | |
| 2007/0124873 | A1 * | 6/2007 | de Lorenzo .............. | D06H 7/04 8/471 |
| 2007/0265781 | A1 * | 11/2007 | Nemethy ............... | G06Q 10/02 702/5 |
| 2010/0328667 | A1 * | 12/2010 | Wegmuller ............... | G01J 3/10 356/402 |
| 2014/0037917 | A1 | 2/2014 | Branch et al. | |
| 2015/0116321 | A1 * | 4/2015 | Fortner ..................... | F41H 3/00 345/420 |
| 2019/0061317 | A1 * | 2/2019 | Karthikeyan ............. | B32B 7/12 |

* cited by examiner

*Primary Examiner* — Sing P Chan
(74) *Attorney, Agent, or Firm* — Welsh Flaxman & Gitler LLC

(57) ABSTRACT

A method for manufacture of a digitally printed decorative surfacing material includes applying a textured layer upon a substrate, processing a digital image to compensate for additional surface area provided by the textured layer so as to produce a resultant digital image, digitally printing the resultant digital image upon the textured layer, applying a top coat layer over the digitally printed image. A digitally printed decorative surfacing material in accordance with the method described above is also provided.

10 Claims, 7 Drawing Sheets

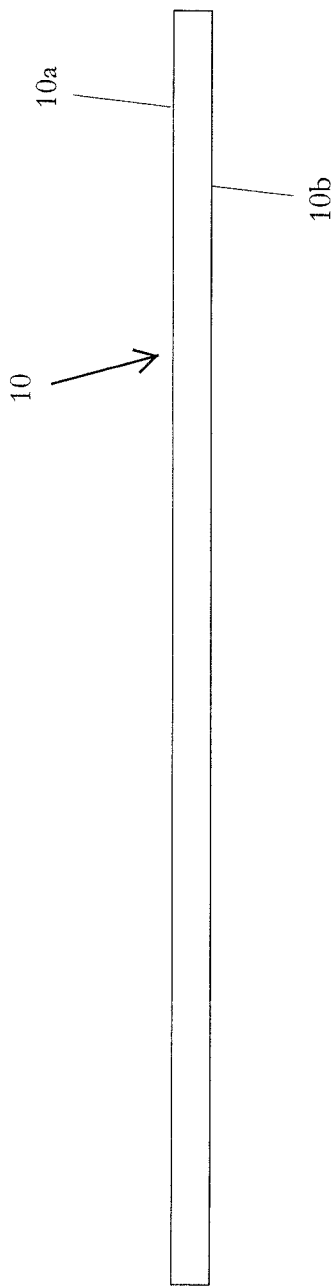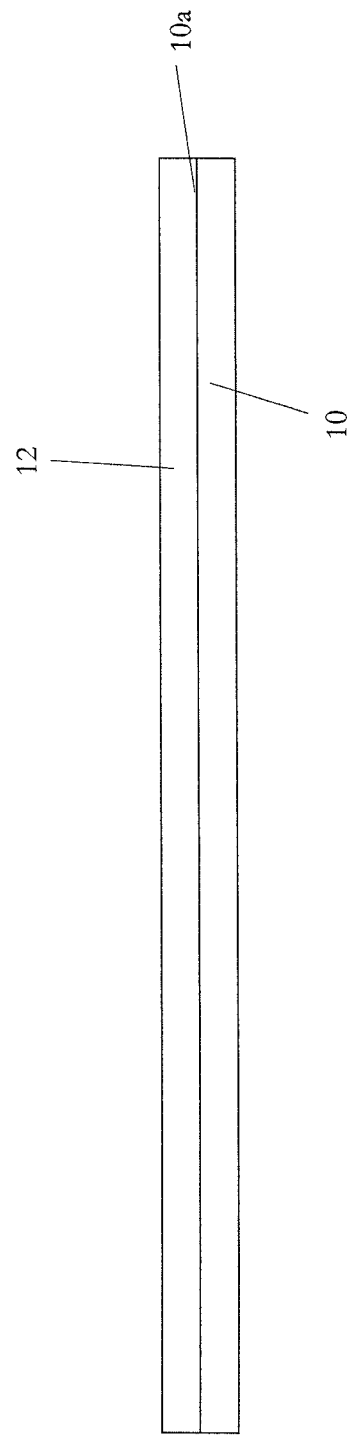
FIG. 1
FIG. 2

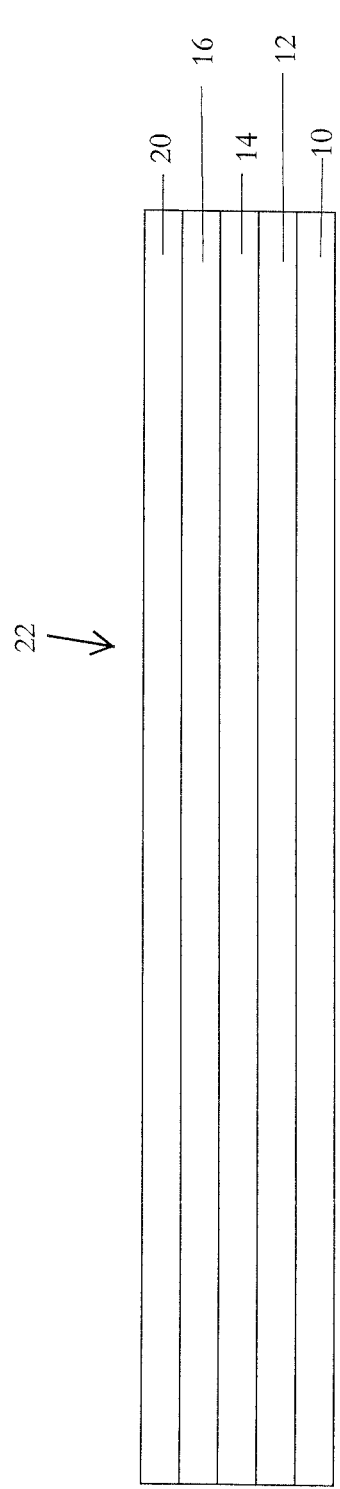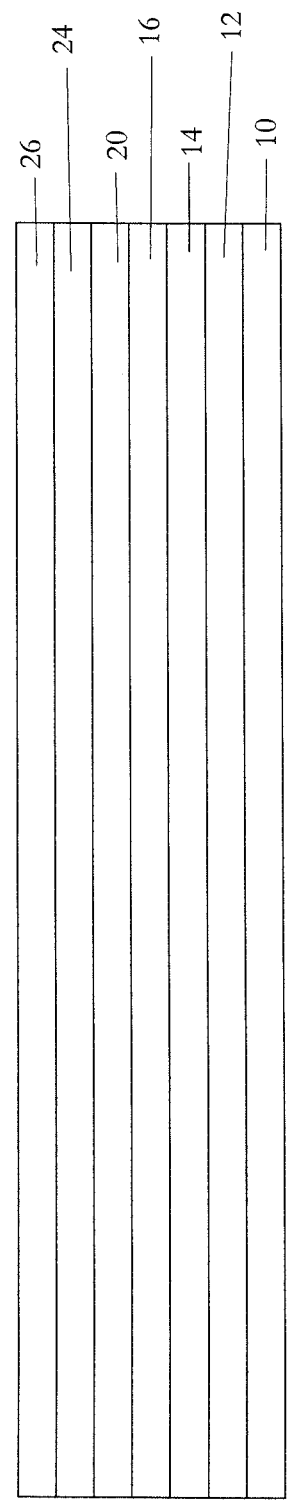
FIG. 5
FIG. 6

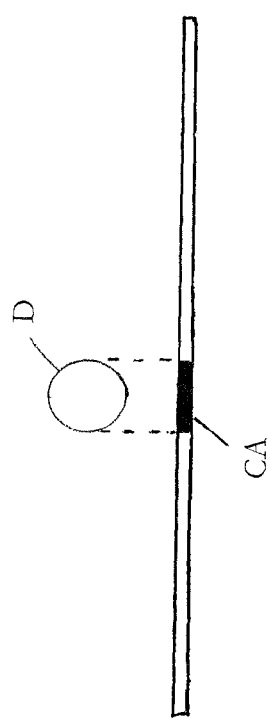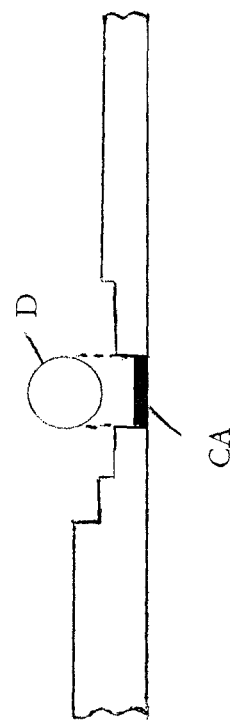

TEXTURED AND DIGITALLY PRINTED DECORATIVE SURFACING MATERIALS

CROSS REFERENCE TO RELATED APPLICATION

This application claims the benefit of U.S. Patent Application No. 62/549,113, entitled "TEXTURED AND DIGITALLY PRINTED DECORATIVE SURFACING MATERIALS," filed Aug. 23, 2017.

BACKGROUND OF THE INVENTION

1. Field of the Invention

The present invention generally relates to textured and digitally printed decorative surfacing materials.

2. Description of the Related Art

The world of decorative surfacing materials is constantly evolving to provide consumers with cutting edge technologies to meet both their aesthetic desires and functional needs. Meeting both the aesthetic desires and functional needs of consumers forces engineers and scientists within the industry to constantly evaluate the current needs of society and address these needs with real world products. The present invention provides a decorative surfacing material that advances the industry by providing a durable, customizable, and cost effective surfacing material.

SUMMARY OF THE INVENTION

It is, therefore, an object of the present invention to provide a method for manufacture of a digitally printed decorative surfacing material. The method includes applying a textured layer upon a substrate, processing a digital image to compensate for additional surface area provided by the textured layer so as to produce a resultant digital image, digitally printing the resultant digital image upon the textured layer, applying a top coat layer over the digitally printed image.

It is also an object of the present invention to provide a method for manufacture of a digitally printed decorative surfacing material wherein the step of processing includes creating a 3-dimensional model of a textured surface of the textured layer and cross correlating the 3-dimensional model with the digital image.

It is another object of the present invention to provide a method for manufacture of a digitally printed decorative surfacing material wherein the step of cross correlating includes overlaying image data within the XY plane of the digital image upon the 3-dimensional model of the textured surface of the textured layer.

It is a further object of the present invention to provide a method for manufacture of a digitally printed decorative surfacing material wherein the step of cross correlating includes altering the digital image to compensate for variations in a Z-direction as exhibited in the textured layer so as to compensate for variation in surface area of the textured layer.

It is also an object of the present invention to provide a method for manufacture of a digitally printed decorative surfacing material including the step of applying a UV cured adhesion promoter layer prior to the step of applying the textured layer.

It is another object of the present invention to provide a method for manufacture of a digitally printed decorative surfacing material including the step of applying a filler layer prior to the step of applying the textured layer.

It is a further object of the present invention to provide a method for manufacture of a digitally printed decorative surfacing material including the step of applying a priming layer prior to the step of applying the textured layer.

It is also an object of the present invention to provide a method for manufacture of a digitally printed decorative surfacing material wherein the substrate is thicker than 0.26 inches.

It is another object of the present invention to provide a method for manufacture of a digitally printed decorative surfacing material wherein the substrate has a thickness of 0.26 inches or thinner.

It is a further object of the present invention to provide a method for manufacture of a digitally printed decorative surfacing material wherein prior to the step of digitally printing a tie layer is applied over the textured layer.

It is also an object of the present invention to provide a digitally printed decorative surfacing material in accordance with the method described above.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 1 to 7 are schematics showing the manufacture of a decorative surfacing material in accordance with the present invention.

FIGS. 11A and 11B show an ink droplet covering a two-dimensional area and a three-dimensional textured area.

DESCRIPTION OF THE PREFERRED EMBODIMENTS

Figure 3:
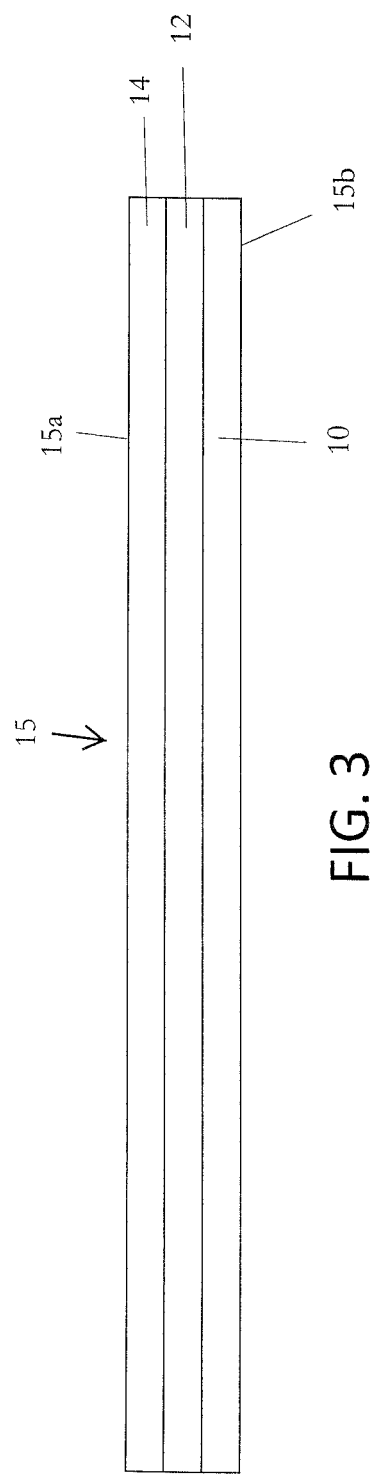

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present invention generally relates to a digitally printed decorative surfacing material 100 (i.e., printed surfacing materials) and a method for the manufacture of the digitally printed decorative surfacing material 100. In accordance with the present invention, digital images are printed upon textured surfaces in a manner coordinating the digital image with the textured surface to ensure proper coverage of the textured surfaces without distorting the original digital image. As the following disclosure explains, slightly different procedures are used where the substrate 10 upon which the digital images are printed is thick and where the substrate 10' upon which the digital images are printed is thin. Thick substrates 10 are considered to be those substrates that are thicker than 0.26 inches, for example, medium density fiberboard and other rigid self-supporting surfacing materials. Thin substrates 10' are considered to be those substrates that are 0.26 inches or thinner, for example, high pressure decorative laminates and other surface materials that are commonly secured to a more rigid support structure.

In accordance with a preferred embodiment for the treatment of thick substrates 10, and with reference to FIGS. 1 to 7, after the top and bottom surfaces 10a, 10b of a substrate 10 are sanded and brushed clean, the substrate 10 of medium density fiberboard (although it is appreciated other materials may be used) is first pre-treated with the application of a UV cured adhesion promoter layer 12 to the top surface 10a of the substrate 10. The UV cured adhesion promoter layer 12 is then air dried in a high speed oven with air blades. The top adhesion promoter layer 12 is then cured using a UV oven. See FIG. 2.

Thereafter, a filler layer 14 is applied over the adhesion promoter layer 12. The filler layer 14 is applied in multiple applications to a coat weight as needed to fill pores and surface imperfections. The filler layer 14 is cured after application. See FIG. 3.

Figure 4:
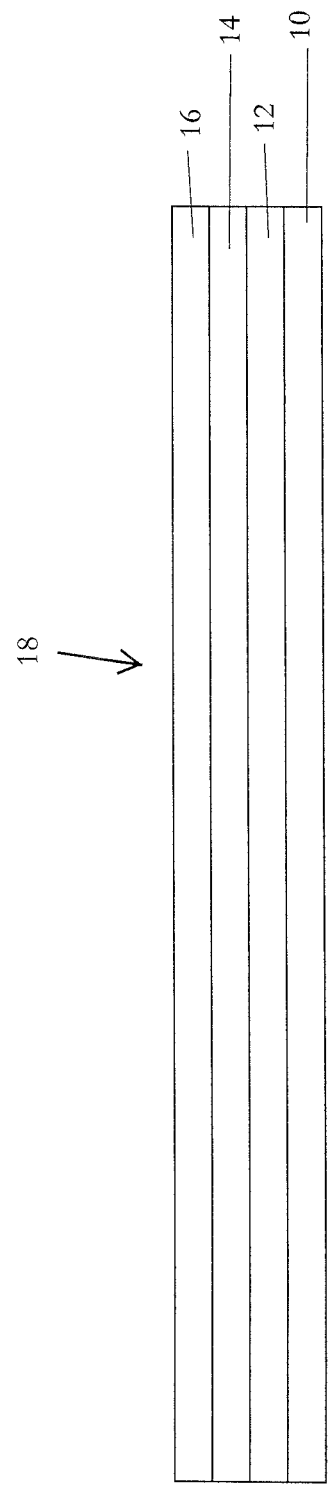

Once the substrate 10 is pre-treated with the adhesion promoter layer 12 and the filler layer 14 to produce an adhesion/filler substrate 15, the top and bottom surfaces 15a, 15b thereof are sanded and brushed clean. A priming layer(s) 16 is then applied to the top surface 15a over the filler layer 14 to create a primed substrate 18 as shown in FIG. 4. It is appreciated a variety of priming materials may be used in accordance with the present invention, for example, priming coatings composed of UV cured acrylics, water-based latex paints, plastic white fillers, paper layers, and ceramic layers. Hot melt polyurethanes may also be used in the formation of the priming layer.

In accordance with a preferred embodiment, and with reference to FIG. 5, a textured layer 20 is then applied over the priming layer 16, that is, to the top surface 18a of the primed substrate 18 (thereby creating a primed and textured substrate 22). The textured layer 20 is applied in accordance with the methodology disclosed in U.S. Pat. No. 9,199,428, entitled "MULTI-LAY ADDITIVE TEXTURE LAMINATES AND METHODS," which is incorporated herein by reference. Briefly, the methodology of the '428 patent provides for the production of a multi-layer additive texture high definition image. The method requires constructing a build layer, wherein the build layer is composed of one or more build levels, and each of the build levels includes a surface having one or more heights. The heights are varied in correspondence with an image that is to be subsequently printed upon the primed and textured substrate. By layering in this manner, a three dimensional textured surface is achieved.

The methodology of the '428 patent employs computers in implementing the method for creating high definition textured surfacing materials. In accordance with the methodology of the '428 patent, a surfacing material image is received and a build value is assigned to each of the one or more image properties in the surfacing material image. The build values relate to a texture specific to the image that will ultimately be applied to the surfacing material. These build values are applied in the creation of the build layer discussed above.

The primed and textured substrate 22 is then ready for digital printing. Prior to printing, the upper surface 22a of the primed and textured substrate 22 is provided with a tie layer 24 over the textured layer 20. The tie layer 24 is adapted to improve adhesion of the ink 26 to the primed and textured substrate 22. With the primed and textured substrate 22 ready for printing, the digital image to be printed thereon is processed to compensate for the additional surface area of the textured surface provided by the textured layer 20 and ensure registration between the digital image and the textured surface.

As those skilled in the art will appreciate, a 4 foot by 8 foot panel with a flat surface exhibits a surface area of 32 square feet, but undulations in the surface result in a greater surface area. The present disclosure employs the terms 2D or 2-dimensional surface area to refer to the surface area of the panel lying within a single plane, and the term 3D or 3-dimensional surface are to refer to the textured surface area of a panel as it undulates in not only the X-direction and the Y-direction, but also in the Z-direction. It is appreciated, the variations between the 2D surface area and the 3D surface area may very differently at various regions of a panel being manufactured in accordance with the present invention.

With this in mind, the primed and textured substrate 22 is first subjected to image processing and a 3-dimensional model of the textured surface of the textured layer 20 is constructed. This 3-dimensional model is cross correlated with the digital image. In particular, the digital image will only have image data within the XY plane (XY image data) and this XY image data is overlayed upon the 3-dimensional model of the textured surface of the textured layer 20. Where the textured surface of the textured layer 20 is flat and lies solely within the XY plane, the XY image data is not altered. However, in regions where the textured surface of the textured layer 20 includes variations in the Z-direction the XY image is altered to compensate for the variation in the surface area of the textured layer 20 of the region. That is, an as the geometry of a three-dimensional image dictates, the surface area of the three-dimensional image may be very different from that of the two-dimensional image, and this is taken into account in accordance with the present invention.

As those skilled in the art will appreciate, by taking the additional surface area resulting from the application of texture into account, the ultimate printed image will more accurately align with underlying texture so as to produce more aesthetically pleasing image. In addition, the modification of the XY image reduces the production of undesirable dark or light spots resulting for applying a quantity of ink that does not accurately match the surface area to which it is applied; for example, the inclusion of texture results in more surface area to cover with ink, but the standard XY image does not take this into account so one might otherwise attempt to print a 20 mm$^2$ XY (two dimensional) image onto a three dimensional surface area of 22 mm$^2$ contained within the 20 mm$^2$ two dimensional area. This is shown schematically in FIGS. 11A and 11B, where an ink droplet D is shown covering a two-dimensional area and a three-dimensional textured area, wherein the coverage area CA is shown with shading below the droplet D. As one appreciates, the interior walls of the three-dimensional textured area will not be part of the coverage area CA covered by the droplet D despite the fact that the three-dimensional textured area has the same area when only considered in the XY plane.

In practice, and by way of example, it is appreciated the physical texture in a woodgrain will mostly be in the dark areas of the design. In a color separated file this is a separate image layer (composed only of the ticking, that is, the physical texture of the wood grain being replicated). This component of the image is adjusted by means of, but not limited to, a mask taking into account the native resolution of the printer and the volume of the drops printed. The intent will be to increase the volume of the printed drops to cover the entire textured surface of the textured layer 20. It is appreciated that the color separation in question has to be scaled up to the final resolution of the print head. At this resolution the correlation between 1 pixel adjustment in the digital front end and the growth of the volume of the printed drops in the final product can be calculated. The depth of the texture is used to calculate the number of pixels by which the image needs to be adjusted. This can then be applied as a mask to compensate for differences between resolution required for the image and the capabilities of the print head. However, and as printing technology, imaging processing, and data processing improve, the ability to alter the XY image will similarly improve and the resolution of such processing will vastly improve.

After the XY image is fully cross correlated with the 3-dimensional model of the textured surface of the textured layer 20, a resultant digital image is generated. Thereafter, and in accordance with a preferred embodiment, the primed and textured substrate 22 is printed digitally with the resultant digital image 26 (see FIG. 6).

Figure 7:
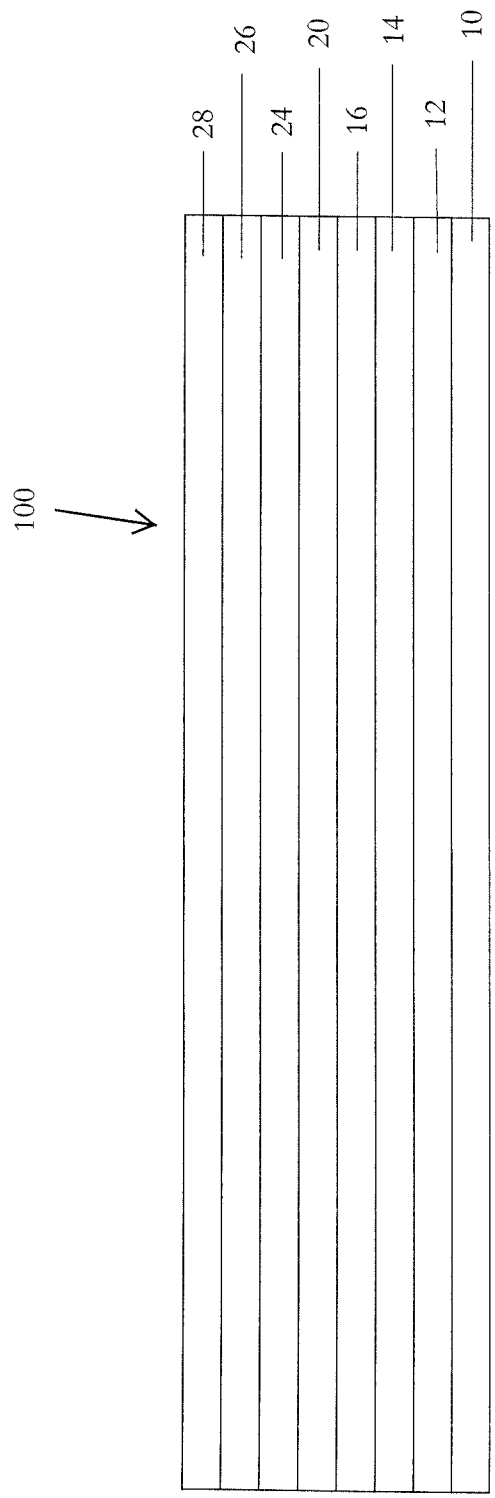

Once the substrate is primed, textured and printed, a top coat layer 28 is applied over the digital image thereto completing the fabrication of the decorative surfacing material (see FIG. 7). The decorative surfacing material is then ready for use.

Figure 8:
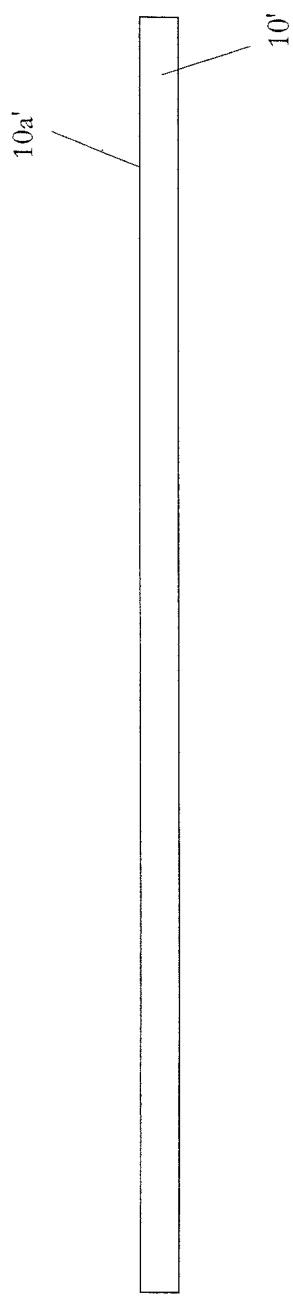
FIGS. 8 to 10 are schematics showing the manufacture of a decorative surfacing material in accordance with an alternate embodiment of the present invention.
Figure 9:
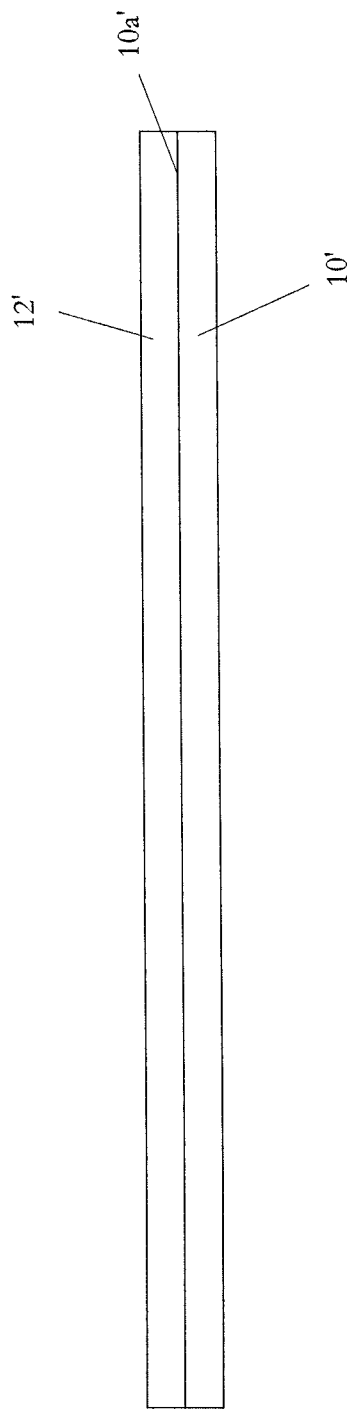
Figure 10:
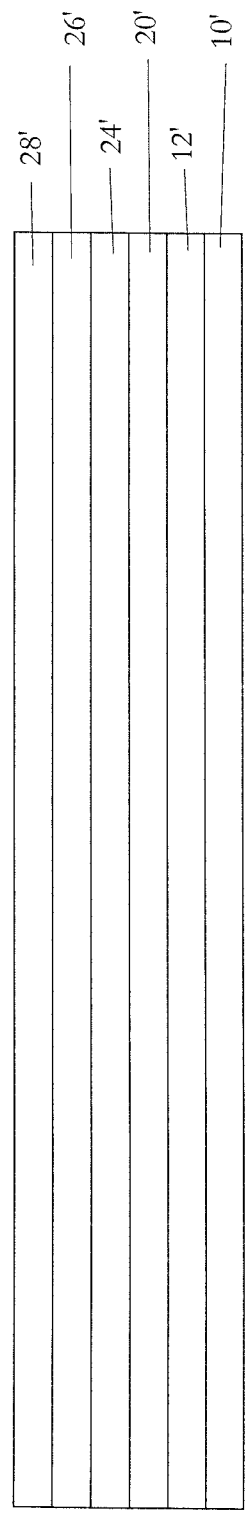

In accordance with an alternate embodiment where the substrate 10' is relatively thin, that is, where the substrate 10' has a thickness less than 0.26 inches, a different process may be implemented in preparation for the application of texture and printing (see FIGS. 8 to 10). The thin substrate 10' may also include one or more components that may result in desired properties. For example, the thin substrate 10' may be manufactured to include, but are not limited to: backers (to prevent warping), grades (to prevent wear impact and stains), formable plastic (allowing the decorative surface to be heat formed or thermoformed around a composite), and metal foil (to provide a highly reflective surface). It is also appreciated the substrate 10' may include fillers and/or additives.

Ultimately, any substrate may be used in accordance with the present invention. For example, the substrate 10' may be composed of standard high pressure laminate/low pressure laminate sheets, thermoplastic laminates, thermoplastic sheets with non-woven backers, mineral/fiber filled thermoplastic sheets, thin wood composites, and other core substrates that have additional functionality. The substrate 10' may be a standard white in some embodiments, or may be colored in other embodiments. Where high pressure laminates are employed, they may be in various grades from standard vertical or horizontal grades, door skin grades, post formable, fire rated, compact laminate grades and any other suitable grades. Where thermoplastic sheets are employed, they may include, but are not limited to, PET, polyethylene, polypropylene, acrylic, polystyrene, EVA, polycarbonate, PEEK, ABS, polycarbonate, any other suitable material, and any combination thereof. The thermoplastic sheets may be extruded into a thin sheet.

As with the prior embodiment, the substrate 10' must be prepared prior to the application of texture and printing. In particular, pretreatment is intended to enhance ink adhesion. For example, high pressure laminates are typically designed for high stain resistance making ink adhesion to such surfaces difficult. As such, and in accordance with a preferred embodiment, an adhesion promoting coating 12' is applied onto the upper surface 10a' of the substrate 10' to provide a high degree of adhesion (ink adhesion) for the three dimensional printed layers. The adhesion promoting coating 12' may comprise a tie coating, a water based urethane, or any other suitable adhesion promoter coating. The coating may be applied by one or more methods, including but not limited to, spray coating or roll coating. Surface treatments to improve ink adhesion may also include, but are not limited to: flame treatment, corona treatment, UV coating treatment, sandblasting, or sanding. Any suitable method to treat a surface may be used.

Once the substrate is prepared, texturing and printing proceed as discussed above with regard to the thick substrate embodiment described with reference to FIGS. 1 to 7. Thereafter, a top coat layer 28' is applied as discussed above.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A method for manufacture of a digitally printed decorative surfacing material, comprising:
    applying a textured layer upon a substrate;
    processing a digital image to compensate for additional surface area provided by the textured layer so as to produce a resultant digital image;
    digitally printing the resultant digital image upon the textured layer;
    applying a top coat layer over the digitally printed image.

2. The method according to claim 1, wherein the step of processing includes creating a 3-dimensional model of a textured surface of the textured layer and cross correlating the 3-dimensional model with the digital image.

3. The method according to claim 2, wherein the step of cross correlating includes overlaying image data within the XY plane of the digital image upon the 3-dimensional model of the textured surface of the textured layer.

4. The method according to claim 3, wherein the step of cross correlating includes altering the digital image to compensate for variations in a Z-direction as exhibited in the textured layer so as to compensate for variation in surface area of the textured layer.

5. The method according to claim 1, further including the step of applying a UV cured adhesion promoter layer prior to the step of applying the textured layer.

6. The method according to claim 1, further including the step of applying a filler layer prior to the step of applying the textured layer.

7. The method according to claim 1, further including the step of applying a priming layer prior to the step of applying the textured layer.

8. The method according to claim 1, wherein the substrate is thicker than 0.26 inches.

9. The method according to claim 1, wherein the substrate has a thickness of 0.26 inches or thinner.

10. The method according to claim 1, wherein prior to the step of digitally printing a tie layer is applied over the textured layer.

* * * * *